United States Patent

Sato et al.

[11] Patent Number: 5,613,369
[45] Date of Patent: Mar. 25, 1997

[54] AIR CONDITIONER AND CONTROL METHOD FOR AN AIR CONDITIONER

[75] Inventors: Takashi Sato; Yasuhiro Kageyama; Masao Isshiki; Harunobu Nukushina, all of Shizuoka-ken, Japan

[73] Assignee: Kabushiki Kaisha Toshiba, Kawasaki, Japan

[21] Appl. No.: 532,108

[22] Filed: Sep. 22, 1995

[30] Foreign Application Priority Data

Sep. 28, 1994 [JP] Japan .................................. 6-233846

[51] Int. Cl.$^6$ .............................. F25D 17/00; F25D 17/04
[52] U.S. Cl. .............................. 62/89; 62/186; 236/78 D; 454/258
[58] Field of Search .................................. 62/228.4, 231, 62/186, 89; 236/78 D, 49.3; 454/258; 165/12, 26

[56] References Cited

U.S. PATENT DOCUMENTS

| | | | |
|---|---|---|---|
| 4,648,551 | 3/1987 | Thompson et al. | 236/49.3 |
| 4,725,001 | 2/1988 | Carney et al. | 62/231 |
| 4,734,871 | 3/1988 | Tsunoda et al. | 236/51 X |
| 4,841,738 | 6/1989 | Katsuki et al. | 62/160 |
| 5,415,346 | 5/1995 | Bishop | 236/78 D |

FOREIGN PATENT DOCUMENTS

| | | | |
|---|---|---|---|
| 1-276319 | 11/1989 | Japan . | |
| 4039540 | 2/1992 | Japan | 236/78 D |

Primary Examiner—William E. Wayner
Attorney, Agent, or Firm—Cushman, Darby & Cushman IP Group of Pillsbury Madison & Sutro LLP

[57] ABSTRACT

An air conditioner and a method for controlling an air conditioner which can operate in at least two operation modes, such as a cooling mode and heating mode. The capacity of the air conditioner is determined based on a difference between a set temperature and the temperature detected by a room temperature sensor every time a set time has elapsed, and the amount of variation of the detected temperature over the set time. The capacity can be controlled using PID control, fuzzy control, genetic algorithm control, or the like. The set time is varied based on the operating mode. Also, the set time can be varied in accordance with the volume of air blown into the room from the air conditioner, the direction of the blown air, the performance rating of the air conditioner and/or the size of the room to be conditioned.

18 Claims, 10 Drawing Sheets

AIR CONDITIONER AND CONTROL METHOD FOR AN AIR CONDITIONER

BACKGROUND OF THE INVENTION

1. Field of Invention

The present invention relates to an air conditioner and a method for controlling an air conditioner.

2. Description of Related Art

Conventional air conditioners have a room temperature sensor, such as a thermistor, and a temperature setting device, such as a remote controller, for setting a room temperature. These air conditioners operate based on the difference between the set room temperature and the room air temperature detected by the room temperature sensor. In an air conditioner having a constant speed compressor, when the detected room air temperature is lower than the set room temperature in a cooling mode, the compressor is turned off. Conversely, when the detected room air temperature is higher than the set room temperature, the compressor is turned on. However, in this type of air conditioner, air conditioning performance is greatly changed when the compressor is turned on and off. Turning the compressor on and off causes the room temperature to change excessively, resulting in uncomfortable air conditioning.

Therefore, an air conditioner having a variable speed compressor has been developed to stabilize the room air temperature at the set room temperature. In this type of air conditioner, the speed of the compressor is controlled by an inverter. A variable frequency output of the inverter is supplied to a compressor motor which drives the compressor. The compressor speed, or output frequency, has been controlled by PI (proportional and integral) control, PID (proportional, integral and differential) control, fuzzy control, GA (genetic algorithms) control, or the like. These controls require two inputs, the difference between the set room temperature and the detected room air temperature, and a room temperature variation at a predetermined period.

In this type of air conditioner, generally, at the time the air conditioner starts, the compressor speed has been determined based only on the difference between the detected room temperature and the set room temperature. After that, the compressor speed has been determined and changed based on the difference between the detected room temperature and the set room temperature, and a room temperature variation between times that the output of the room temperature sensor is determined. The room temperature variation is calculated based on the difference in detected room temperatures before and after a set time between readings of the room temperature sensor.

In this case, the time interval for calculating the room temperature variation was preset as a constant. The time interval was not related to variations of operating mode, such as cooling, heating and dehumidifying, or variations in the direction that air is blown, which is determined by the direction of a louver provided at an air outlet (hereafter called "louver direction") and a volume of conditioned air. However, the temperature of air blown from the air conditioner varies with operating mode, differences in the volume of conditioned air which is controlled by an indoor fan, differences in the louver direction, and so on. Thus, the room temperature variations were detected at time intervals which were uniformly set with no relation to these differences, resulting in poor air conditioner control.

When air conditioning performance is changed, a delay occurs between a change in the actual room temperature and a change in the room temperature detected by the room temperature sensor. When in the heating mode, as shown by FIG. 7, the temperature of the air blown from an indoor unit 10 of the air conditioner is high. Therefore, the air flow in the room may take the path of arrow A shown in FIG. 7. Thus, the effect of a variation in air conditioning performance is quickly detected by room temperature sensor 14 of indoor unit 10 which is mounted in the upper part of the room. When in the cooling mode, as shown by FIG. 8, the temperature of the air from indoor unit 10 is low. Therefore, the cool air sinks, following the path of arrow B, and warm air in the room is taken in by the air conditioner since the warm air rises, following the path of arrow C. Thus, detection of a change in air conditioning performance by room temperature sensor 14 of indoor unit 10 is delayed. Consequently, the relationship between detected room temperature Ta of room temperature sensor 14 and air conditioning performance and time are as shown in FIGS. 9(a) and 9(b). At instant t0, the air conditioning performance is varied in step form, such as when air conditioning starts. During the heating mode, detected room temperature Ta varies upward at instant t2 when time L1 has elapsed from instant t0. However, during the cooling mode, a change in temperature is delayed. Detected temperature Ta does not start to fall until instant t3, a time L2 (>L1) after instant t0.

If room temperature sensor 14 of the air conditioner is positioned in the lower part of the room, the situation is reversed from the case where it is positioned in the upper part of the room. Therefore, the temperature variation during the cooling mode is detected faster than during the heating mode.

As above described, the room temperature sensor's response depends on the air conditioning mode. However, in a conventional air conditioner, the timing at which the room temperature sensor is monitored is a constant interval independent of the air conditioning mode. Therefore, proper operation, or proper compressor speed suitable for the condition of the room, could not be obtained in at least one mode.

The same problem occurs when the louver direction or the air volume is altered. As shown in FIGS. 10(a) and 10(b), when the louver is directed upward during a heating operation, detected room temperature Ta rises at instant t2, which is a small delay from the instant t1 at which the air conditioning performance, or the compressor speed, is varied. When the louver is directed downward, detected room temperature Ta rises at instant t3, which is a larger delay from instant t1.

Also, when the volume of air blown from the air conditioner is "Strong", "Weak" or "Slight", as shown in FIGS. 11(a) and 11(b), detected room temperature Ta rises in the order "Strong", "Weak" and "Slight" at instants t2, t3 and t4 with sequentially larger delays from instant t1 at which the air conditioning performance is varied. Furthermore, the amount of delay between a variation in air conditioning performance and detection by the room temperature sensor differs based on the volume and height of the room to be air conditioned, and differences in the ratings of the air conditioners themselves.

If the time interval at which the room temperature is monitored is set relatively shorter than the delay at which a performance variation is detected by the room temperature sensor, air conditioning operation, e.g., the compressor speed, is further changed before the effect of the initial performance variation is detected by the room temperature sensor. Therefore, the compressor speed is further increased when the previous monitoring cycle caused the compressor speed to increase, and the compressor speed is further decreased when the previous monitoring cycle caused the compressor speed to decrease. Thus, the actual room temperature will vary from the set temperature by a large amount, and a hunting phenomenon will occur.

If the time interval at which the room temperature is monitored is set relatively longer than the delay at which an operation variation is detected by the room temperature sensor, the next adjustment in air conditioner operation occurs at a time when the effect of the previous performance adjustment has become sufficiently apparent, e.g., after the detected room temperature has changed in response. Therefore, the room temperature is stably controlled. However, the time for the room temperature to assume the set temperature increases and the variation of the compressor speed at each time becomes large since the variation in room temperature between the set times becomes large. Thus, the time for the room temperature to reach a comfortable temperature, e.g., the set room temperature, becomes long.

SUMMARY OF THE INVENTION

It is an object of the invention to provide an improved air conditioner which can accurately control the air conditioning operation.

It is another object of the invention to improve a method for controlling an air conditioner.

It is further object if the invention to provide a temperature control which can reach a set room temperature in a short time without variations in room temperature such as a hunting phenomenon.

To achieve the above objects, the present invention provides an improved air conditioner and method for controlling an air conditioner which is capable of operating in at least two modes, such as a cooling mode and a heating mode. The operation of the air conditioner is controlled based on the difference between a set temperature and the temperature detected by a room temperature sensor every time a set time has elapsed, and the amount of variation of the detected temperature before and after the set time period. The set time is varied based on the operating mode. Also, the set time is varied in accordance with the volume of air blown into the room by the air conditioner, the direction of the blown air, the operation of the air conditioner or the size of the room to be conditioned.

DETAILED DESCRIPTION OF THE PREFERRED EMBODIMENTS

A first embodiment of the present invention will be explained with reference to FIGS. 1 to 5(c).

Figure 1:
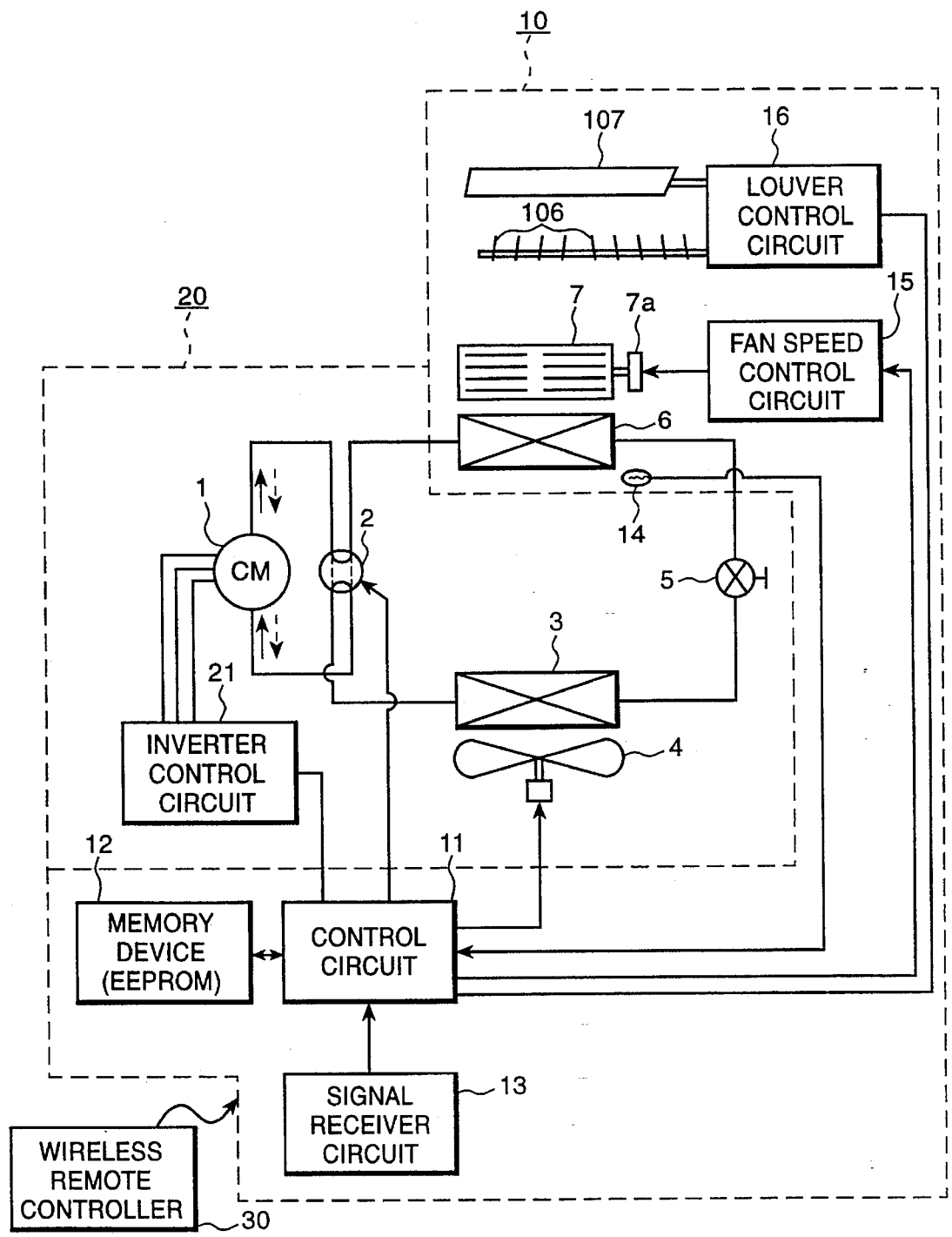
FIG. 1 is a block diagram showing a refrigerating circuit and control system of an air conditioner according to the invention.

An air conditioner having a refrigerating circuit is shown in FIG. 1. The refrigerating circuit includes compressor 1, four-way valve 2, outdoor heat exchanger 3, expansion valve 5 and indoor heat exchanger 6. Refrigerant is circulated in this circuit by compressor 1. Indoor fan 7, such as a cross-flow fan, is provided near indoor heat exchanger 6. Air in the room to be air conditioned is taken in through indoor heat exchanger 6 by indoor fan 7, and then, after conditioning, is blown out into the room. Outside air is taken in through outdoor heat exchanger 3 by outdoor fan 4, such as a propeller fan.

The direction of refrigerant flow is changed by switching four-way valve 2. In a cooling mode, the refrigerant flows in the direction of the solid arrow in FIG. 1. In this mode, indoor heat exchanger 6 functions as an evaporator. Thus, air, cooled as a result of heat exchange in indoor heat exchanger 6, is blown into the room. In a heating mode, the refrigerant flows in the direction of the dotted arrow in FIG. 1. Indoor heat exchanger 6 functions as a condenser, so hot air is blown into the room.

The air conditioner is separated into two units—indoor unit 10, which is installed in the room, and outdoor unit 20, which is positioned outside the room. Indoor heat exchanger 6 and indoor fan 7 are housed in indoor unit 10. Compressor 1, four-way valve 2, outdoor heat exchanger 3, outdoor fan 4 and expansion valve 5 are housed in outdoor unit 20.

In order to control this refrigerating circuit, indoor unit 10 includes control circuit 11. Control circuit 11 includes a microcomputer having a ROM and a RAM; memory device 12 in which performance control data required for control are stored; signal receiver circuit 13, which receives various setting signals transmitted from outside using infra-red rays and supplies them to control circuit 11; room temperature sensor 14, such as a thermistor, which detects the room air temperature and supplies the detected temperature data to control circuit 11; louver control circuit 16 which controls the direction of the air blown from the air conditioner; and fan speed control circuit 15 which drives indoor fan motor 7a at variable speed. Memory device 12 is an EEPROM (electrical erasable programmed read only memory). Therefore, performance control data, stored in the EEPROM, can be changed by electrical signal. Outdoor unit 20 includes inverter control circuit 21, which outputs variable frequency power to a motor (not illustrated) which drives compressor 1, in response to instructions from control circuit 11. Wireless remote controller 30 is provided which transmits various types of setting signals to indoor unit 10.

Figure 2:
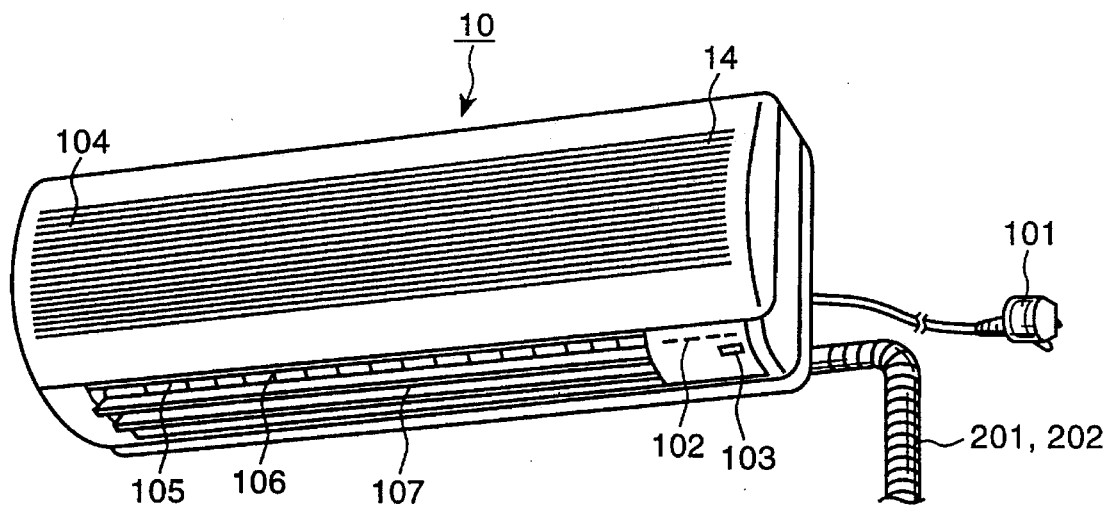
FIG. 2 is a perspective view of an indoor unit of the air conditioner.

Indoor unit 10 is shown in FIG. 2. Commercial AC power is supplied to indoor unit 10 via power plug 101 and a power line. Indoor unit 10 is oblong in shape and mounted on a wall of the room to be air conditioned. A main display unit 102, which displays the operating state, and receiver 103, which receives setting signals transmitted from wireless remote controller 30, are provided at the lower right of indoor unit 10. The front face is composed of a plurality of slits like intake ports 104, and the bottom is composed of a long, narrow blower port 105. Right/left flow direction control louvers 106 and upward/downward flow direction control louvers 107 are provided in blower port 105, and their respective angles can be controlled by control circuit 11 via louver control circuit 16. A filter (not shown) which collects dust in the air is provided between intake port 104 and indoor heat exchanger 6 which is housed in indoor unit 10.

Figure 3:
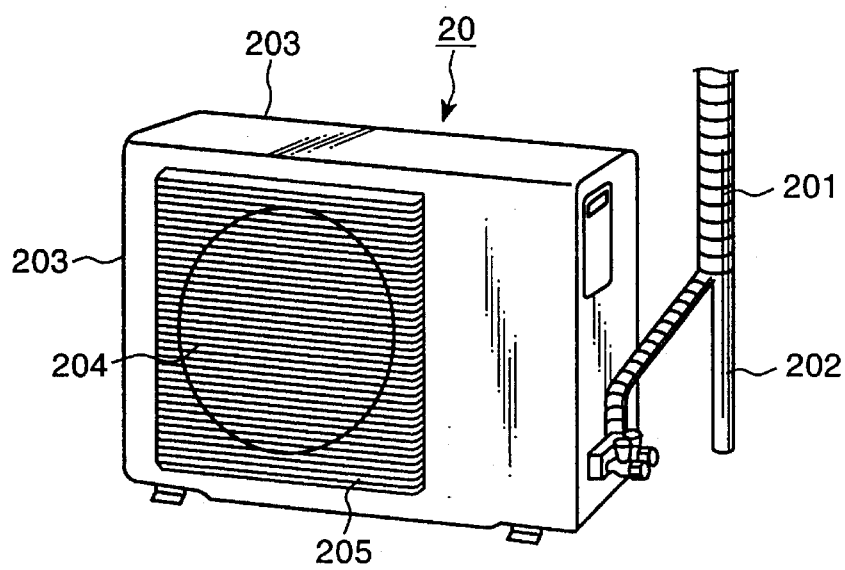
FIG. 3 is a perspective view of an outdoor unit of the air conditioner.

Outdoor unit 20 is shown in FIG. 3. Outdoor unit 20 receives AC power and control instructions from indoor unit 10 through piping/wiring 201 which is connected to indoor unit 10. Drainpipe 202 for draining off any water condensed by indoor heat exchanger 6 is led to the outside with piping/wiring 201 from indoor unit 10. In front of outdoor unit 20, blower port 204 is covered with mesh 205 for safety, because outdoor fan 4, which rotates at high speed, is arranged inside indoor unit 20. Air intake ports 203 are provided at the side and rear of outdoor unit 20.

Figure 4:
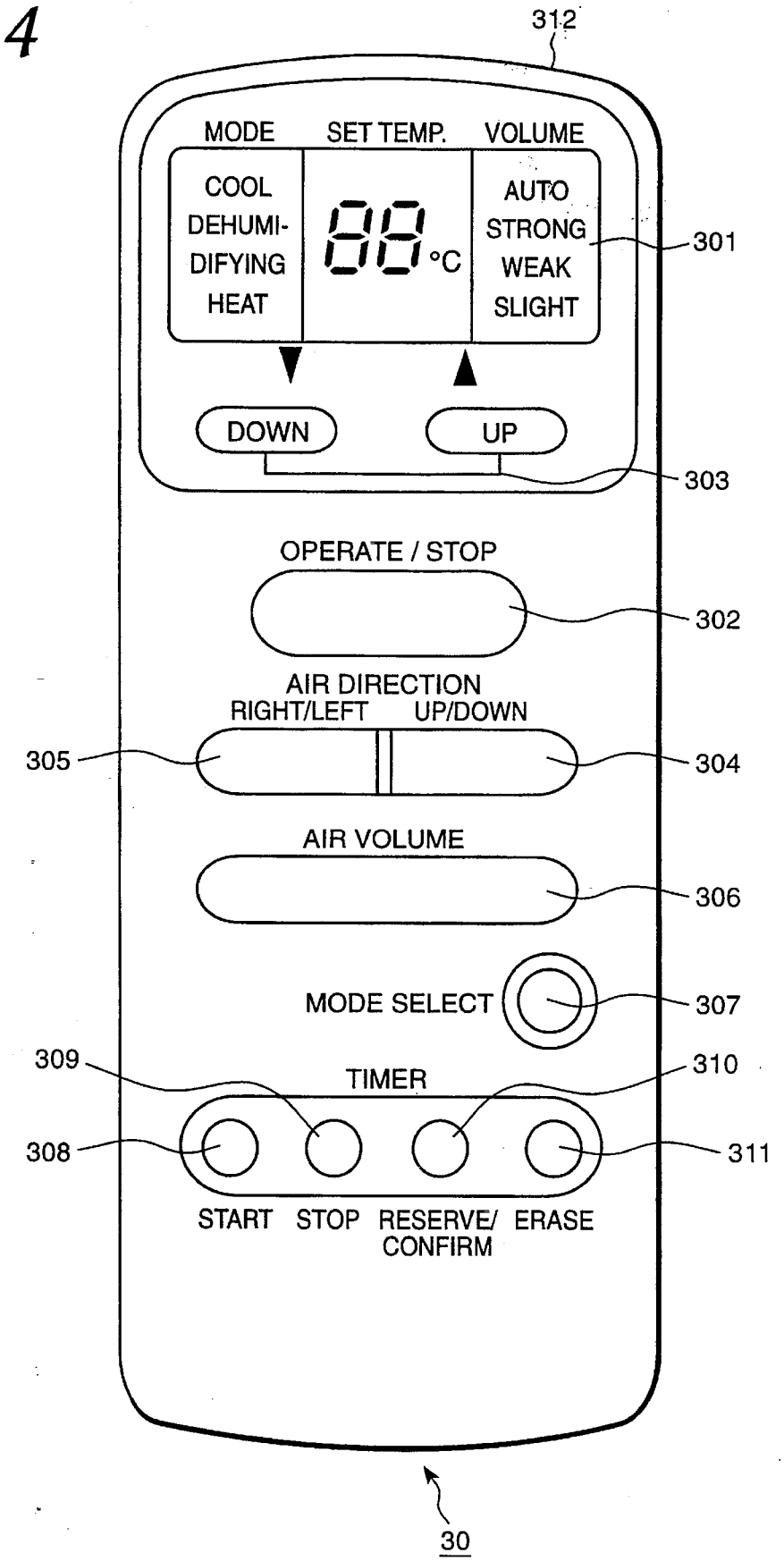
FIG. 4 is a plan view of a wireless remote controller of the air conditioner.

A plan view of wireless remote controller 30 is shown in FIG. 4. Wireless remote controller 30 is long, narrow, and comparatively thin for easy holding. Liquid crystal display 301, which indicates the operation mode, the set temperature and air volume, is provided at the front top of wireless remote controller 30. Below this are provided in sequence, temperature setting buttons 303 for incrementing/decrementing the set temperature; "Operate"/"Stop" button 302 which starts and stops air conditioner operation; air direction buttons 304 and 305, air volume button 306 which selects one air volume among four air volume settings; and mode select button 307. Air direction button 304 is for controlling the direction of upward/downward flow direction louver 107, while air direction button 305 is for controlling the direction of right/left flow direction control louver 106. Also, at the bottom of the front face, timer start button 308, timer stop button 309, timer reserve/confirm button 310 and timer erase button 311 are provided in a horizontal row. Transmitter unit 312 which houses a infra-red LED is provided at the top end. Thus, infrared rays are transmitted from here.

Wireless remote controller 30 sets the room temperature by temperature setting button 303, and displays that set temperature on display 301. In this case, the room internal temperature can be set in the range of 19° C. to 30° C. in 1° C. steps. Also, the air volume blown into the room can be manually set to "Slight", "Weak", "Strong" or "Automatic" by air volume button 304. In the "Automatic" setting, the actual air volume is appropriately selected from "Slight", "Weak" or "Strong", based on the difference between the detected room temperature and the set room temperature by control circuit 11. The air volume setting is also indicated on display 301. When mode select button 307 is operated, the operating mode can be switched between "Cooling", "Dehumidifying" (Drying) and "Heating", and that state is displayed on display 301. These setting values are transmitted as infra-red signals from transmitter unit 312 to receiver circuit 13 of indoor unit 10 together with a "Start Operation" instruction signal when "Operate"/"Stop" button 302 is operated when the air conditioner is stopped. Also, when at least one of these settings is changed during air conditioner operation, wireless remote controller 30 transmits a setting signal without the "Start Operation" instruction signal.

The "Start Operation" instruction signal, together with the set temperature, operating mode, air volume and louder direction (flow direction) instruction signals, are transmitted from wireless remote controller 30 and received by receiver circuit 13 of indoor unit 10. Receiver circuit 13 transforms these transmitted infra-red signals to electrical signals, such as "H" and "L" voltages, and then transfers these electrical signal to control circuit 11.

A room temperature signal detected by room temperature sensor 14 is also supplied to control circuit 11. Each input, signal is decoded by the microcomputer in control circuit 11 and is processed according to its content. The direction of upward/downward louver 107 is set diagonally downward when the heating mode starts and horizontal when the cooling or dehumidifying mode starts. However, after the air conditioner has been operating for a predetermined time, a user can alter the direction by operating wireless remote controller 30.

Control circuit 11 is provided with the following control functions:

(1) A timer function which sets mutually different set times according to the operating mode (cooling, heating or dehumidifying), the air volume and the air direction, and outputs a signal every set time.

(2) A set room temperature variation detection function which detects variations of the set temperature which has been changed during operation.

(3) An operation variation function which varies the air conditioning operation according to the difference between the set temperature before variation and after variation when a variation of the set temperature is detected by the temperature variation detection function.

(4) A function which stores the detected value of the room temperature sensor in the RAM of the microcomputer every time the timer function outputs a signal.

(5) A first calculation function which calculates the difference between the set temperature and the temperature detected by the room temperature sensor every time the timer function outputs a signal.

(6) A second calculation function which calculates the difference between the previously detected room temperature, which was stored in the RAM of the microcomputer, and the present room temperature which is detected by the room temperature sensor every time the timer function outputs a signal.

(7) A capacity variation value output function which finds a variation value of the air conditioning capacity based on the temperature difference calculated by the first calculation function and the temperature difference calculated by the second calculation function.

(8) A capacity setting function which sets a new air conditioning capacity value by adding/subtracting the air conditioning capacity variation value found by the capacity variation value output function to/from the previous air conditioning capacity value.

The air conditioner capacity depends on the compressor rotational speed. In this embodiment, therefore, control circuit 11 controls the compressor rotational speed via inverter control circuit 21 based on the determined air conditioning capacity value.

Figure 5A:
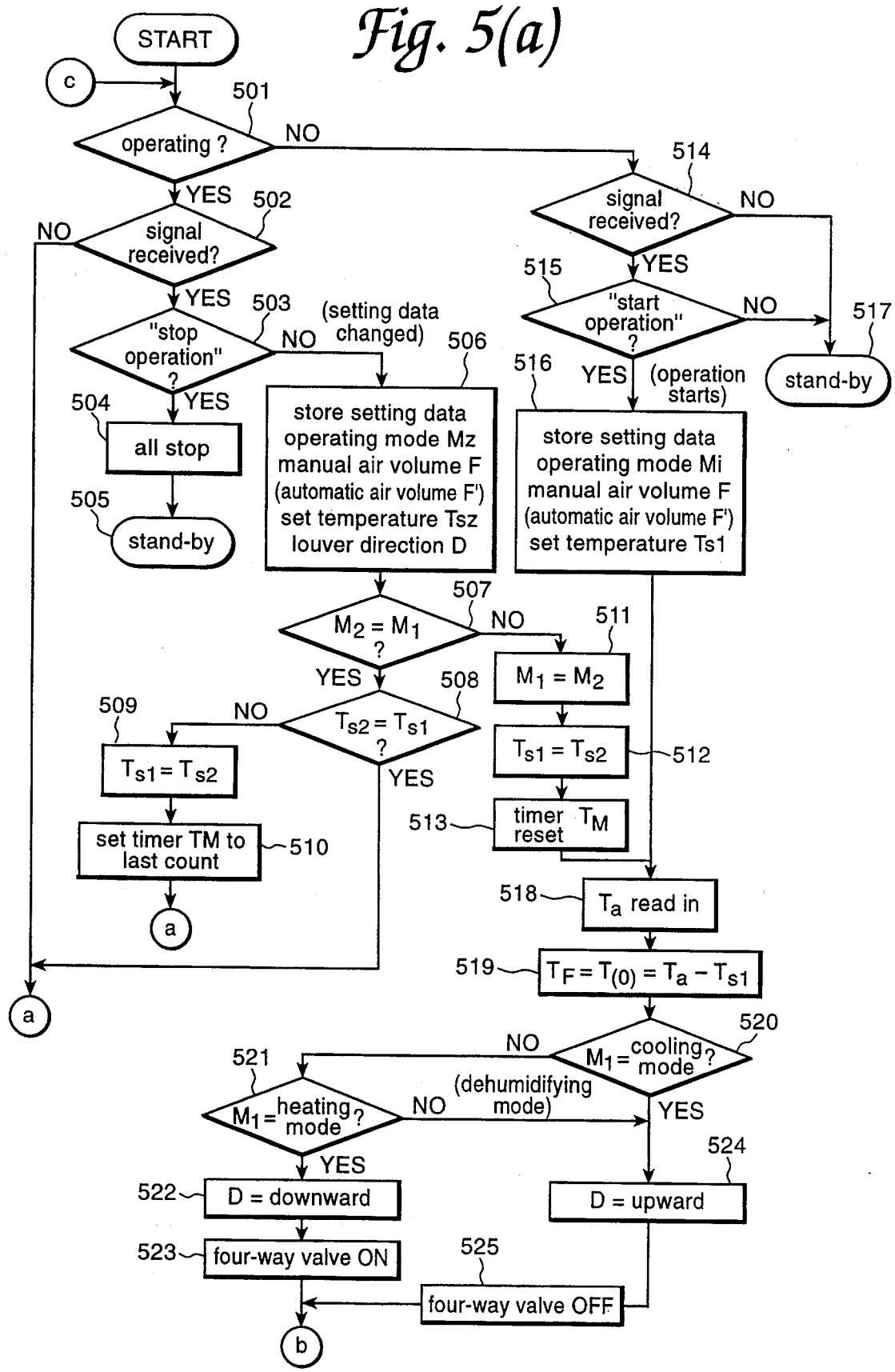
FIGS. 5(a) to 5(c) are flowcharts showing the processing sequence of the air conditioner.
Figure 5B:
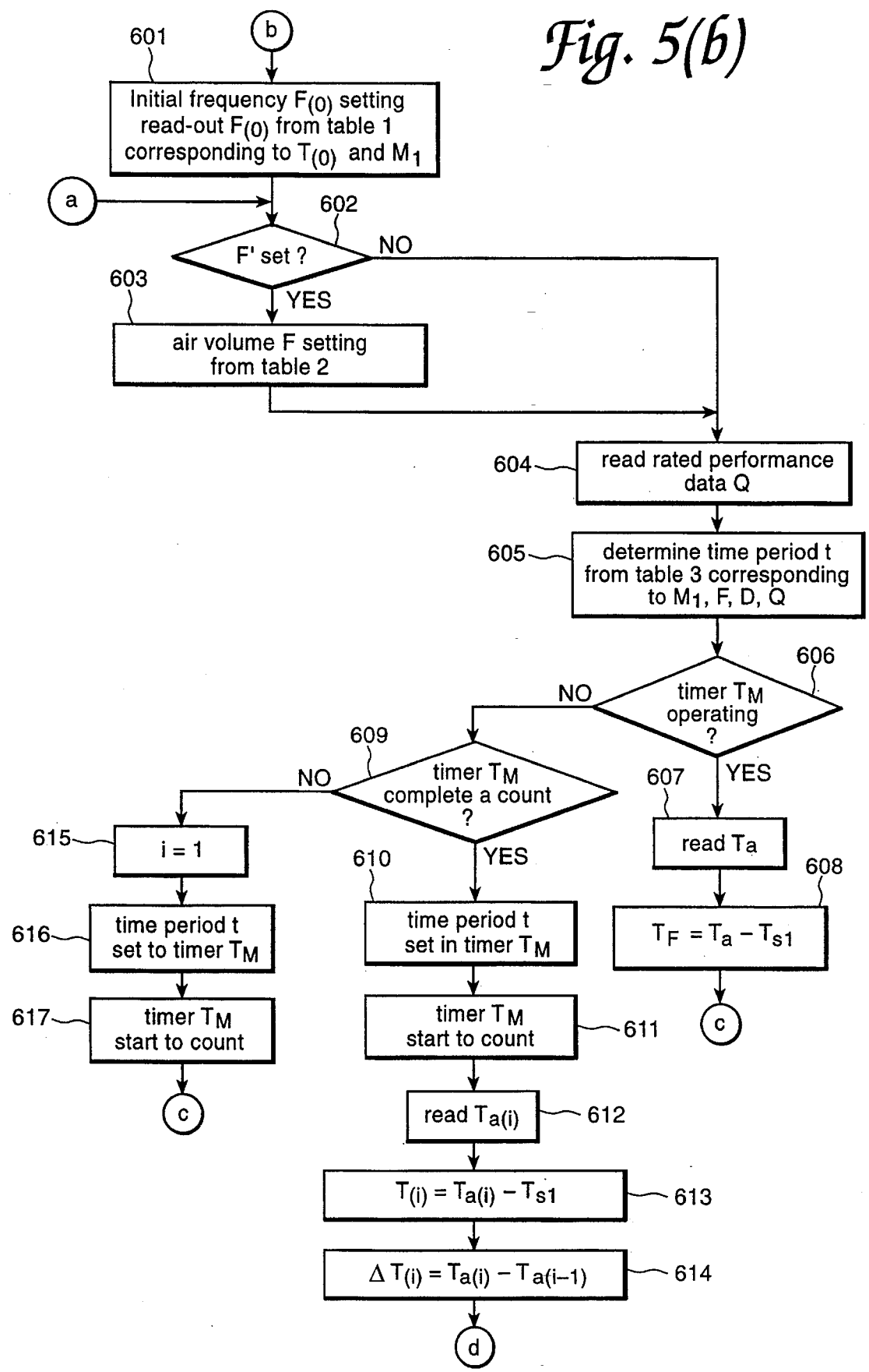
Figure 5C:
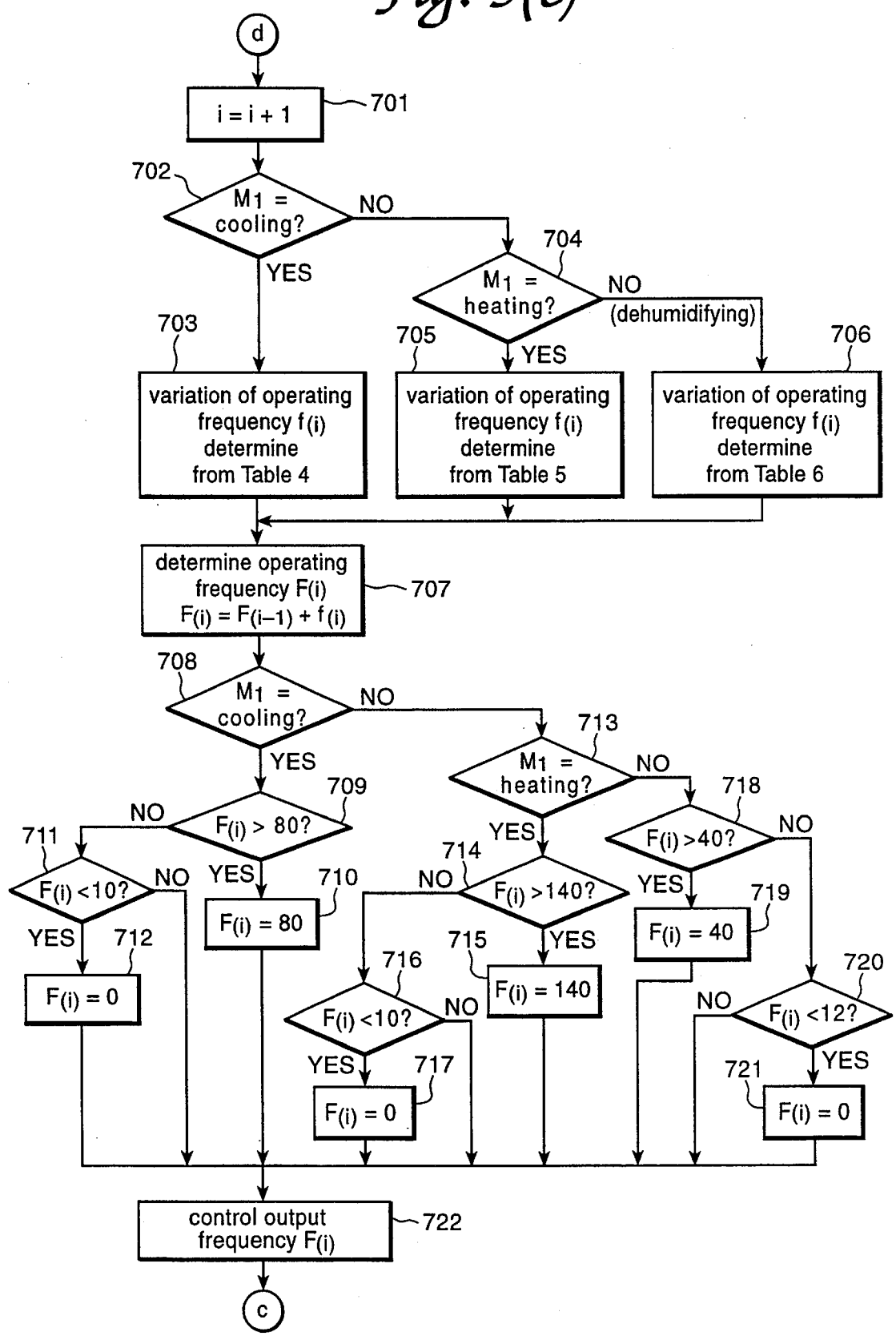

The following is a description of the processing by the microcomputer in control circuit 11 with reference to the flowcharts shown in FIGS. 5(a) to 5(c). This program is prestored in the ROM of the microcomputer in control circuit 11. The processing starts when commercial AC power is supplied to the air conditioner via the power line. Control circuit 11 judges whether the air conditioner is operating or not (step 501). If it is operating, control circuit 11 judges whether or not a signal has been received (step 502). If a signal has been received, it is determined whether or not that signal contains a "Stop Operation" instruction (step 503). If a "Stop Operation" instruction has been received, control circuit 11 completely stops air conditioning operation. That is, the output from inverter control circuit 21 to compressor and the rotation of indoor fan 7 and outdoor fan 4 are stopped (step 504). Then control circuit 11 goes to a stand-by state (step 505).

If the received signal does not contain a "Stop Operation" instruction in step 503, setting data are stored (step 506). That is, control circuit 11 stores operating mode M2, manual air volume F (or automatic air volume F'), set temperature Ts2 and louver direction D. This step is performed because at least one item of setting data has been changed using wireless remote controller 30. Thus, it is necessary to determine which setting data has changed. Accordingly, control circuit 11 determines whether or not the present operating mode M2 is the same as previously stored operating mode M1 (step 507). If the operating mode has not changed, or M2=M1, the program determines whether or not set temperature Ts2 of the present occasion agrees with set temperature Ts1 which was stored previously (step 508). In the case of agreement or if no signal was received in step 502, the processing in step 602 (shown in FIG. 5(b)), which is described later, is executed.

If step 508 determines that set temperatures Ts2 and Ts1 do not agree, set temperature Ts2 is stored in step 509 as set temperature Ts1 which is then used for processing. Then, timer TM is set to its final count value as if it had completed counting (step 510). Here, timer TM measures the reference time for finding the variation of the detected temperature inside the room. Also, when step 507 determines that there is disagreement between operating modes M2 and M1, operating mode M2 is stored in step 511 as operating mode M1 which is then used for processing, and set temperature Ts2 is stored in step 512 as set temperature Ts1 which is then used for processing. Then, timer TM is reset in step 513, and the processing in step 518, which is described later, is executed.

However, when step 501 determines that the air condition is not operating, step 514 determines whether or not a signal from wireless remote controller 30 has been received. If a signal has been received, the program determines whether or not the "Start Operation" instruction is contained in that signal (step 515). If the "Start Operation" instruction is contained, the content of each setting is stored (step 516). That is to say, it stores operating mode M1, manual air volume F (or automatic air volume F') and set temperature Ts1. As above described, the direction of louvers 107, 106 can not be controlled until after the predetermined time from the start of the air conditioner. Therefore, the louver direction data is not stored in step 516.

If the "Start Operation" instruction has not been received as determined in step 515, the received data may be noise. Therefore, the received signal is not processed. Accordingly, the program goes to the stand-by state (step 517).

After step 513 or 516, detected room temperature Ta is read in from room temperature sensor 14 (step 518). Then, the difference TF=T(0) (=Ta–Ts1) between the detected room temperature Ta and set room temperature Ts1 is calculated (step 519). Then, it is determined whether the operating mode M1 is cooling, heating or dehumidifying (steps 520 and 521). If it is heating, the program goes to step 522, upward/downward louver 107 of indoor unit 10 is set in the downward direction (step 522). Then, the refrigerating circuit is switched to heating by turning on four-way valve 2 (step 523). If the mode is cooling or dehumidifying, upward/downward louver 107 is set in a downward direction (step 524), and the refrigerating circuit is switched to cooling by turning off four-way valve 2 (step 525). Upward/downward louver 107 and four-way valve 2 are controlled according to the operating mode in this way.

Then, as shown in FIG. 5(b), the output frequency of inverter control circuit 21 is determined (step 601). That is, initial operating frequency F(0) of the motor which drives compressor 1, is selected from Table 1 below in response to temperature difference T(0), and operating mode M1.

TABLE 1

| | Initial Operating Frequency F0 (Hz) | | |
|---|---|---|---|
| T(0) (°C.) | Cooling | Mode Heating | Dehumidifying |
| T(0) > 2.0 | 80 | 0 (off) | 40 |
| 2.0 ≧ T(0) > 1.5 | 60 | 0 (off) | 35 |
| 1.5 ≧ T(0) > 1.0 | 50 | 10 | 30 |
| 1.0 ≧ T(0) > 0.5 | 40 | 20 | 25 |
| 0.5 ≧ T(0) > 0 | 30 | 40 | 20 |
| 0 ≧ T(0) >–0.5 | 20 | 50 | 15 |
| –0.5 ≧ T(0) >–1.0 | 10 | 60 | 12 |
| –1.0 ≧ T(0) >–1.5 | 0 (off) | 80 | 0 (off) |
| –1.5 ≧ T(0) >–2.0 | 0 (off) | 110 | 0 (off) |
| –2.0 ≧ T(0) | 0 (off) | 140 | 0 (off) |

Table 1 is stored in the ROM of the microcomputer. A frequency which corresponds to temperature difference T(0) and the operating mode M1 is read-out as the initial frequency F(0) from Table 1. Then, inverter control circuit 21 outputs AC power having the initial frequency to the compressor motor. Thus, compressor 1 starts to operate at initial operating frequency F(0). At that time, temperature difference T(0) is stored in order to determine the next operating frequency.

As shown in Table 1, initial operating frequency F(0) is set so, that during cooling, frequency F(0) becomes higher as the room temperature becomes higher than the set temperature and, during heating, frequency F(0) becomes higher as the room temperature becomes lower than the set temperature. For dehumidifying, the tendency for frequency F(0) to rise is the same as in cooling. However, the frequency never exceeds a maximum of 40 Hz.

After the initial frequency f(0) setting, the program determines whether or not the air volume is set to "Automatic" or F' (step 602). If the air volume is set to "Automatic", the program advances to step 603, and sets air volume F to correspond to the temperature difference TF (°C.) and the operating mode. In this case, as shown in Table 2 below, air volumes F corresponding to room temperature differences TF and the operating modes are stored in the ROM of the microcomputer. Therefore, as with the initial frequency setting, the air volume value corresponding to temperature difference TF and the operating mode M1 is read-out, and is used to set the speed of indoor fan 7. As a result, indoor fan 7 starts to operate at air volume F. At that time, air volume F is stored.

TABLE 2

| | Air Volume F in "Automatic" setting | | |
|---|---|---|---|
| TF (°C.) | Cooling | Mode Heating | Dehumidifying |
| TF > 1.5 | "Strong" | OFF | "Weak" |
| 1.5 ≧ TF > 0.5 | "Weak" | "Slight" | "Slight" |
| 0.5 ≧ TF > −1.0 | "Slight" | "Weak" | "Slight" |
| −1.0 ≧ TF | OFF | "Strong" | OFF |

As shown in Table 2, when air volume is "Automatic", air volume F is set so that during cooling, it becomes larger as the room temperature becomes higher than the set temperature, and conversely, becomes smaller during heating. For dehumidifying, the tendency for the air volume to rise is the same as with cooling. However, the maximum setting is made to be "weak".

In the dehumidifying mode of this embodiment, the compressor speed and the air volume, or the indoor fan rotational speed, is set lower than in the cooling mode, and four-way valve is controlled the same as for cooling. Therefore, the temperature of indoor heat exchanger 6 becomes low, the moisture in the room condenses on indoor heat exchanger, and the condensed water is drained off to the outside via drainpipe 202. Accordingly, the humidity in the room is decreased by this dehumidifying mode of operation.

When air volume F is determined in this way (step 603), or when the air volume is manually set to "Slight", "Weak" or "Strong", rated performance data Q of the air conditioner, of which the details are described later, are read in the same way from EEPROM 12 in step 604. The interval t at which the detected room temperature is read based on stored or determined operating mode M1, air volume F, louver direction D and rated performance data Q (step 605) is determined in accordance with Table 3, below. Timer TM sets time periods t as stored in the ROM of the microcomputer and reads time t from there.

TABLE 3

| Rated Performance | Louver Direction | Air Volume | Set Time Period t (sec) | | |
|---|---|---|---|---|---|
| | | | Cooling | Heating | Dehumidifying |
| High | Upward (Horizontal) | "Strong" | 65 | 55 | — |
| | | "Weak" | 100 | 80 | 95 |
| | | "Slight" | 120 | 115 | 115 |
| | Downward (includes Diagonally Downward) | "Strong" | 75 | 65 | — |
| | | "Weak" | 115 | 85 | 110 |
| | | "Slight" | 140 | 120 | 135 |
| Low | Upward (Horizontal) | "Strong" | 60 | 50 | — |
| | | "Weak" | 90 | 70 | 85 |
| | | "Slight" | 120 | 110 | 115 |
| | Downward (includes Diagonally Downward) | "Strong" | 70 | 60 | — |
| | | "Weak" | 110 | 85 | 110 |
| | | "Slight" | 140 | 120 | 135 |

As shown in Table 3, as the rated air conditioning performance Q increases, generally, the set time period t of timer TM increases. With regards to the louver directions (the air flow directions), since the detected temperature changes more slowly for the downward direction, set time period t is longer for the downward direction. Also, with regard to air volume, the smaller the air volume, the slower the detected temperature variation. Therefore, the set time period t is longer for smaller air volume. Moreover, with regard to cooling and heating, in this embodiment, the air conditioner is provided in the upper part of the room. Therefore, the detected temperature variation is slower during cooling. As a result, set time period t is longer for cooling. However, when the air conditioner is provided in the lower part of the room, the reverse is the case.

In this embodiment, the rated performance of the air conditioner is used for determining set time period t. However the rated performance can correspond to the maximum performance of the air conditioner because the maximum performance is usually proportional to the rated performance.

After the determination of set time period t, the program determines whether timer TM is operating or not (step 606). If it is operating, room temperature Ta detected by room temperature sensor 14 is read as the current room temperature Ta (step 607). Then, the difference TF (=Ta−Ts1) between the detected room temperature Ta and set temperature Ts1 is calculated (step 608). Following this, the program executes the processing in step 501 (FIG. 5(a)).

If timer TM is not operating, the program determines whether or not timer TM has completed its count, that is to say whether or not set time period t has been counted by timer TM (step 609). If it has completed its count, present time period t determined in step 605 is set in timer TM (step 610), and timer TM is re-started (step 611). Then, room temperature Ta(i) detected by room temperature sensor 14 at this time is read (step 612), and the difference T(i) between detected room temperature Ta(i) and set temperature Ts1 is calculated in step 613. Following this, temperature changing ΔT(i) is calculated (step 614) which is the temperature difference between detected room temperature Ta(i−1), which was read before time period t, and Ta(i), which is read in step 612. Then, the processing shown in step 701 of FIG. 5(c) is executed.

When timer TM has not completed its count in step 609, the air conditioner operation is in an initial state or the program is being executed for the first time. Thus, "1" is set in a counter which indicates the number of detections of room temperature that have occurred for calculating temperature change ΔT(i) in step 614 (step 615). Then, time period t which was determined in step 605 is set in timer TM (step 616). After timer TM has been started in step 617, the program returns to the first step 501 (FIG. 5 (a)).

In step 701 shown in FIG. 5(c), counter "i" is incremented by "1" in order to determine whether this is the initial processing or a second or later processing. After that, the program determines whether or not the operating mode is cooling (step 702). If it is cooling, the variation of the operating frequency f(i) is determined based on temperature difference T(i) of detected room temperature Ta(i) with regard to set temperature Ts1 and room temperature change ΔT(i) at time period t which is set on timer TM (step 703). In this case, as shown in Table 4 below, the capacity variation value, that is to say the variation of operating frequency f(i), which corresponds to temperature difference T(i) of detected room temperature Ta(i) and set temperature Ts1, and room temperature change ΔT(i) from the detected temperature T(i−1) on the previous occasion is stored in the RAM of microcomputer and is read from there.

As can be seen from comparing the variation values in Table 4 and Table 5 for the cooling and heating modes, respectively, the heating variation values are set larger because the air conditioning load is larger in the heating mode as compared to the cooling mode.

In step 704, when it is determined that the operating mode is not heating, the operating mode must be dehumidifying. In this case, the variation of operating frequency f(i) is

TABLE 4

(Cooling mode)

| T(i) (°C.) | Variation of Operating Frequency f(i) (Hz) | | | | |
|---|---|---|---|---|---|
| | ΔT(i) ≦−0.75 | −0.75 < ΔT(i) ≦−0.25 | −0.25 < ΔT(i) ≦0.25 | 0.25 < ΔT(i) ≦0.75 | 0.75 < ΔT(i) |
| 1.75 ≦ T(i) | 10 | 18 | 25 | 18 | 20 |
| 1.25 ≦ T(i) < 1.75 | 8 | 0 | 18 | 18 | 15 |
| 0.75 ≦ T(i) < 1.25 | −15 | −8 | 10 | 20 | 12 |
| 0.25 ≦ T(i) < 0.75 | −12 | −12 | 0 | 10 | 8 |
| −0.25 ≦ T(i) < 0.25 | −15 | −8 | 0 | 5 | 5 |
| −0.75 ≦ T(i) <−0.25 | −10 | −15 | −5 | 8 | 8 |
| −1.25 ≦ T(i) <−0.75 | −15 | −15 | −8 | 0 | 5 |
| −1.75 ≦ T(i) <−1.25 | −15 | −15 | −10 | −10 | 0 |
| T(i) <−1.75 | −20 | −18 | −18 | −15 | −10 |

In this embodiment, each variation of operating frequency f(i) is basically calculated and determined by using a GA (genetic algorithm) set at the factory. However, other data, for example, calculated by a fuzzy logic algorithm can be used. Furthermore, rather than being stored in a table, the variation of the operating frequency f(i) can be calculated each time it is needed. In this case, these data need not be stored in the ROM of the microcomputer.

If the operating mode is not cooling in step 702, the program determines whether or not the operating mode is heating (step 704). If it is heating, in the same way, the variation of operating frequency f(i) is determined in step 705 based on temperature difference T(i) (=Ta(i)−Ts1) which is calculated in step 613 and temperature change ΔT(i) (=Ta(i)−Ta(i−1)) which is calculated in step 614. In this case, the capacity variation value, that is to say variation of operating frequency f(i), is determined from Table 5 in response to temperature difference Ti(i) and temperature change ΔT(i).

determined based on temperature difference T(i) and temperature change ΔT(i), which is the difference between the present room temperature T(i) which is detected in step 612 and the previously detected and stored temperature T(i−1) before the interval set on timer TM (step 706). In this case, as shown in Table 6 below, the capacity variation values, that is variations of operating frequency f(i), based on temperature difference T(i) and temperature change ΔT(i) is read from the ROM of the microcomputer.

TABLE 5

(Heating mode)

| T(i) (°C.) | Variation of Operating Frequency f(i) (Hz) | | | | |
|---|---|---|---|---|---|
| | ΔT(i) ≦−0.75 | −0.75 < ΔT(i) ≦−0.25 | −0.25 < ΔT(i) ≦0.25 | 0.25 < ΔT(i) ≦0.75 | 0.75 < ΔT(i) |
| 1.75 ≦ T(i) | −30 | −20 | −15 | −10 | 0 |
| 1.25 ≦ T(i) < 1.75 | −20 | −15 | −10 | 0 | 0 |
| 0.75 ≦ T(i) < 1.25 | −20 | −15 | −10 | 0 | 10 |
| 0.25 ≦ T(i) < 0.75 | −20 | −10 | −8 | 0 | 15 |
| −0.25 ≦ T(i) < 0.25 | −15 | −10 | 0 | 5 | 10 |
| −0.75 ≦ T(i) <−0.25 | −10 | −8 | 0 | 10 | 15 |
| −1.25 ≦ T(i) <−0.75 | −5 | 0 | 5 | 10 | 20 |
| −1.75 ≦ T(i) <−1.25 | −10 | 0 | 10 | 15 | 25 |
| T(i) <−1.75 | 10 | 8 | 12 | 20 | 30 |

TABLE 6

(Dehumidifying mode)

| T(i) (°C.) | Variation of Operating Frequency f(i) (Hz) | | | | |
|---|---|---|---|---|---|
| | ΔT(i) ≦−0.75 | −0.75 < ΔT(i) ≦−0.25 | −0.25 < ΔT(i) ≦0.25 | 0.25 < ΔT(i) ≦0.75 | 0.75 < ΔT(i) |
| 1.75 ≦ T(i) | 10 | 15 | 20 | 15 | 15 |
| 1.25 ≦ T(i) < 1.75 | 8 | 5 | 15 | 15 | 10 |
| 0.75 ≦ T(i) < 1.25 | −10 | −5 | 8 | 15 | 8 |
| 0.25 ≦ T(i) < 0.75 | −10 | −10 | 0 | 10 | 5 |
| −0.25 ≦ T(i) < 0.25 | −12 | −5 | 0 | 5 | 5 |
| −0.75 ≦ T(i) <−0.25 | −10 | −5 | −5 | 8 | 5 |
| −1.25 ≦ T(i) <−0.75 | −10 | −10 | −8 | 0 | 5 |
| −1.75 ≦ T(i) <−1.25 | −10 | −10 | −10 | −5 | 0 |
| T(i) <−1.75 | −12 | −12 | −15 | −10 | −5 |

For dehumidifying operations shown in Table 6, as can be seen when compared with Table 4, the variation values are set smaller than for cooling in order to get high dehumidifying efficiency.

Next, the frequency F(i) of the output current of inverter control circuit 21, which is supplied to the motor of compressor 1, is determined (step 707). However, the output frequency F(i) which is determined in step 707, is not used for the actual output frequency of inverter control circuit 21. Instead, the limiting process in steps 708 to 721 is applied first. In step 707, the operating frequency F(i) is calculated by adding the variation of operating frequency f(i) determined in steps 703, 705 and 706 to operating frequency F(i−1) which was determined before the start of the period set by timer TM. Then, the calculated operating frequency is limited between the maximum frequency and the minimum frequency in each operating mode. When the calculated result of operating frequency F(i) exceeds the maximum frequency in that operating mode, operating frequency is set at the maximum frequency. On the other hand, when the calculated result of operating frequency F(i) is smaller than the minimum frequency in that operating mode, operating frequency is set at 0, that is compressor 1 stops. The data shown in Table 7 are stored in the ROM of the microcomputer as the maximum and minimum frequencies in each operating mode.

TABLE 7

| | Maximum Frequency (Hz) | Minimum Frequency (Hz) |
|---|---|---|
| Heating mode | 140 | 10 |
| Cooling mode | 80 | 10 |
| Dehumidifying mode | 40 | 12 |

Thus, in the following step 708, the program checks whether or not operating mode M1 is the cooling mode. If it is the cooling mode, the program determines whether operating frequency F(i) is greater than the maximum frequency "80" or not (step 709). If it is greater, the program sets operating frequency F(i) at "80 (Hz)" (step 710). If operating frequency F(i) is less than maximum frequency "80" in step 709, the program determines whether operating frequency F(i) is less than minimum frequency "10 (Hz)" (step 711). When it is less, operating frequency F(i) is set at "0", that is the output is stopped (step 712).

If operating mode M1 is not the cooling mode in step 708, the program determines whether operating mode M1 is the heating mode (step 713). If it is the heating mode, the program determines whether or not operating frequency F(i) is greater than the maximum frequency "140 (Hz)" (step 714). If it is greater than 140, operating frequency F(i) is set at "140" (step 715). If it is less than maximum frequency "140", the program determines whether or not it is less than minimum frequency "10" (step 716). If it is less than 10, operating frequency F(i) is set at "0" (step 717).

If operating mode M1 is not the heating mode in step 713, the air conditioner is in the dehumidifying mode. The program then determines whether or not operating frequency F(i) is greater than the maximum frequency "40 (Hz)" (step 718), and if it is greater, operating frequency F(i) is set at "40" (step 719). If it is less than maximum frequency "40" in step 718, the program determines whether or not it is less than minimum frequency "12 (Hz)" (step 720). If it is less, operating frequency F(i) is set at "0" (step 721).

After adjusting operating frequency F(i) in this way, the operating frequency is applied to inverter control circuit 21 so that its output frequency becomes the determined frequency (step 722), and the processing in step 501, described above, is executed.

Limiting operating frequency F(i) to less than the maximum frequency prevents compressor 1 and inverter control circuit 21 from breaking down at high speeds and prevents the condenser from freezing. Limiting operating frequency F(i) to more than the minimum frequency stabilizes operation.

As a result of this processing, when, for example, the user changes the operating mode during operation using wireless remote controller 30, initial operating frequency F(0) is freshly determined from Table 1 at step 601. Then, the detected room temperature Ta is read and temperature difference T(0) is calculated for the next occasion. After time period t (interval t), which is determined from Table 3 in step 605, has elapsed, a new detected room temperature Ta(i) is read and T(i) (=T(a)−Ts1) is calculated in steps 612 and 613. Then, variation of operating frequency F(i) is determined in steps 703, 705 and 706, performed at interval t.

When there is a change in the louver direction D or a change in the air volume F from wireless remote controller 30 part-way through interval t, processing is performed as it stands until that set time has elapsed. Then, time period t is determined to correspond to the newly changed state for the next interval.

Also, when there is an alteration of the set temperature during operation (step 508 "No"), in order that the altered operation should be implemented promptly, interval t is ignored (step 510). After performing steps 602, 604 to 606, and 609 to 614, variation of operating frequency f(i) based on both temperature difference T(i) between detected room temperature Ta(i) and set temperature Ts1, at the moment of altering the set temperature, and change ΔT(i) from the previous detected room temperature T(i−1) to the present detected room temperature T(i) is read from one of Tables 4, 5 and 6 (steps 702–706). A fresh operating frequency F(i) is then determined by adding f(i) to the operating frequency F(i−1) from the ending interval (step 707). That is to say, this case is handled in the same way as if the set time of timer TM, or interval t has elapsed.

Also, when the air volume is set on "Automatic" by wireless remote controller 30, an actual air volume F is automatically determined in accordance with temperature difference T(i) and the operating mode Mi as shown in Table 2 (step 603). As a result, when the air volume value F is altered, a new interval t is determined in step 605. However, time TM is not changed. Therefore, step 606 determines that timer TM continues to operate, so, that steps 607, 608, etc., are performed. Therefore, although the air volume blown by indoor fan 7 changes immediately, interval t is not updated until timer TM completes its count.

When the air volume setting is changed by wireless remote controller 30 during operation, the signal indicating the air volume setting change is detected in step 503. Then, the program passes through steps 506 to 508, and 602 to 605. In step 605, a fresh interval t is determined based on the fresh air volume setting. In the same manner as described above, interval t is not updated until time TM finishes counting.

Furthermore, it is desirable to implement the air conditioner control circuit with a microcomputer so that the same hardware can be used with many models, enhancing standardization. At the same time, many types of air conditioners are in existence. Some models have large air conditioning performance ratings, while other models have small ratings. Generally, models with large air conditioning performance ratings are installed in rooms with large volumes, while models with small air conditioning performance ratings are installed in rooms with small volumes. Even though machines are installed with air conditioning performance ratings corresponding to the volume of rooms in this manner, it takes time to supply and circulate air in a room with a large volume, while the time required for supplying and circulating air in a room with a small volume is short. For this reason, the response of a room temperature sensor in a model with a large rating is generally slow, while the response of the room temperature sensor in a model with a small rating is generally fast.

In order to compensate for this, in this embodiment, data for the microcomputer to identify the machine model is pre-stored at the manufacturing stage of the air conditioner in the EEPROM of memory device 12. Also, the parameters for setting interval t include not only operating mode M1, indoor fan air volume F and louver direction D, but also performance rating data Q for each model. The data stored in the EEPROM are electrically inputted at the manufacturing stage of the air conditioner after the model in which the EEPROM is to be incorporated has been determined. Therefore, the program for the air conditioner stored in ROM remains the same for all models, and the universality of the microcomputer and the control circuit are preserved.

In the above embodiment, interval t is the timing between successive readings of room temperature T(i), determinations of variations of operating frequencies f(i) and determinations of operating frequency F(i). Interval t is varied by a combination of operating mode M1, the indoor fan air volume F, louver direction D and rated performance of the air conditioner Q. However, when an air conditioner is operated at a specified setting, the size of the room (the air conditioning load) can be estimated by the degree that the room temperature varies. Accordingly, first, the degree of change of temperature for the specified air conditioning capacity is detected. After that, the size of the room is judged from the degree of change. Then interval t may be determined for the detected room size.

Figure 6:
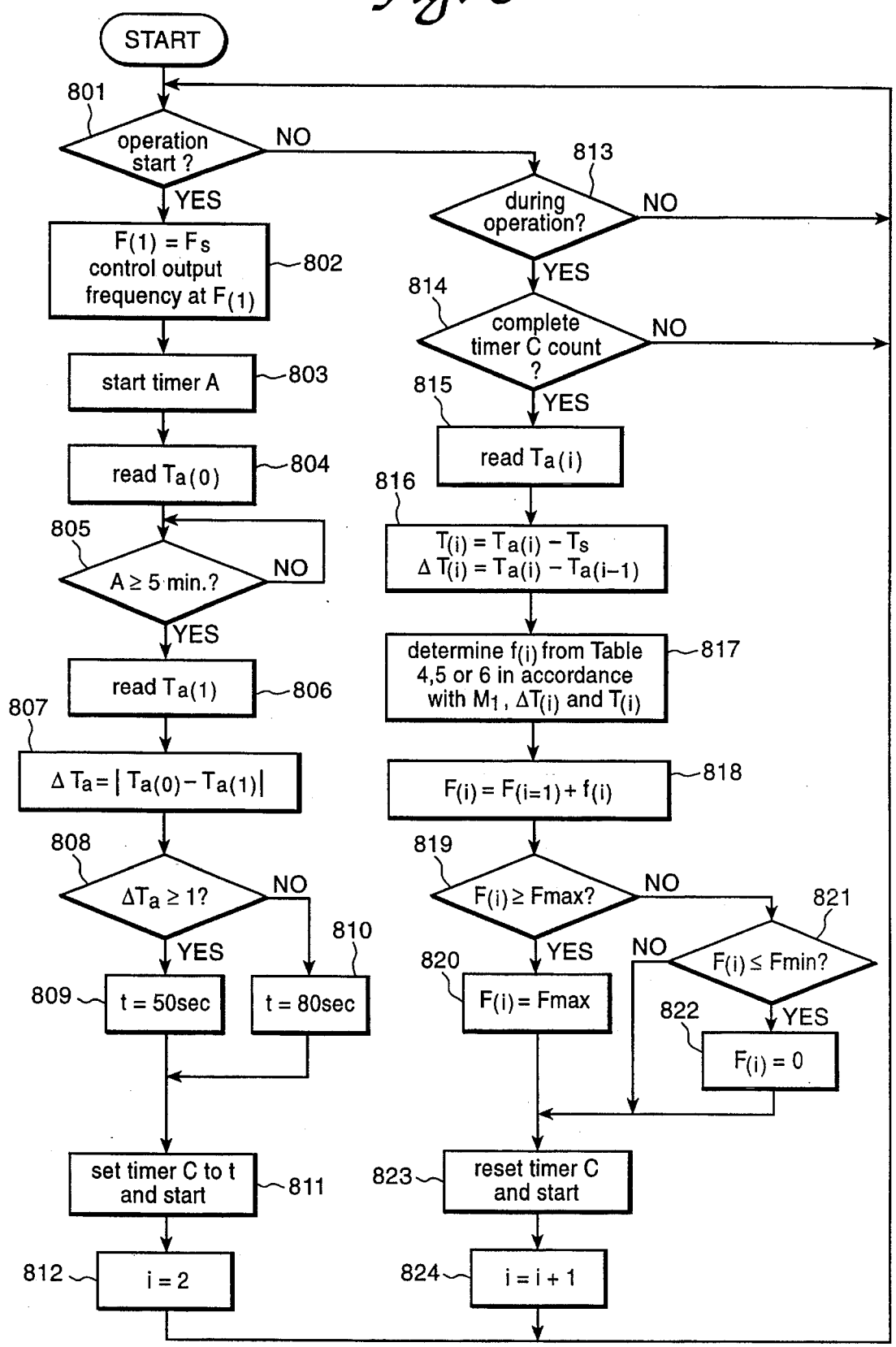
FIG. 6 is a flowchart of a second embodiment according to the invention.
Figure 7:
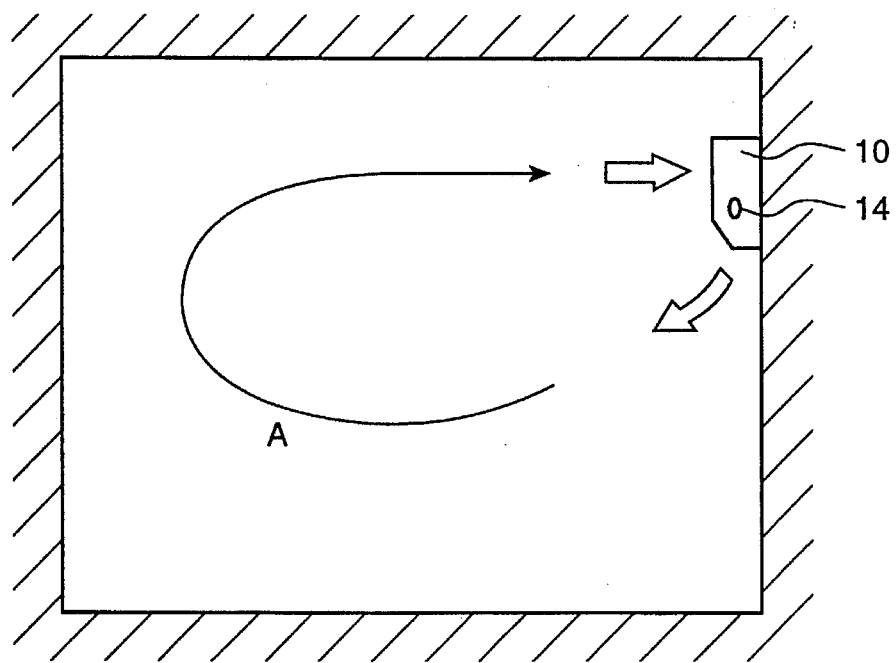
FIG. 7 is an illustration of air circulation inside a room to be air conditioned in a heating mode.
Figure 8:
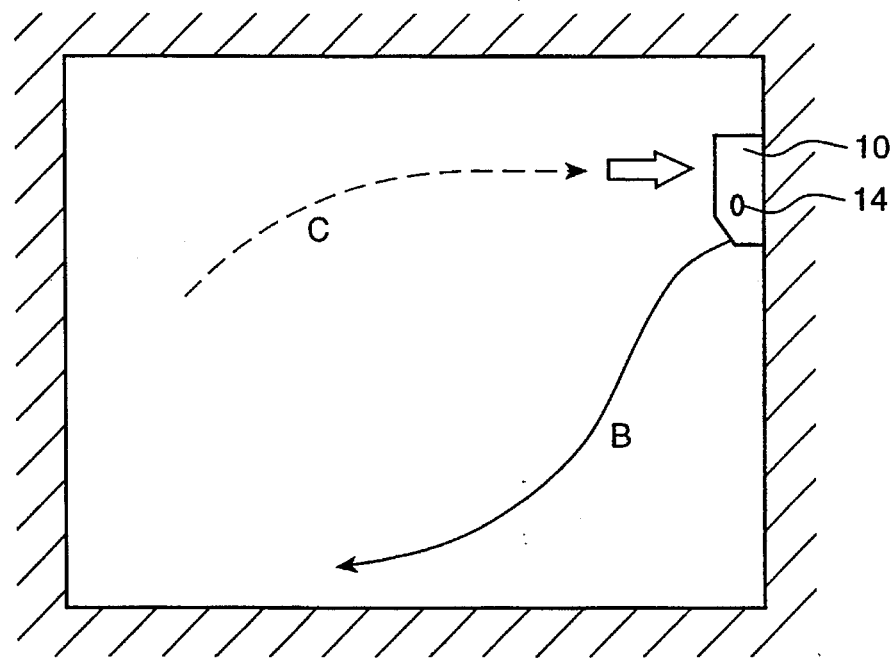
FIG. 8 is an illustration of air circulation inside a room to be air conditioned in a cooling mode.
Figure 9A:
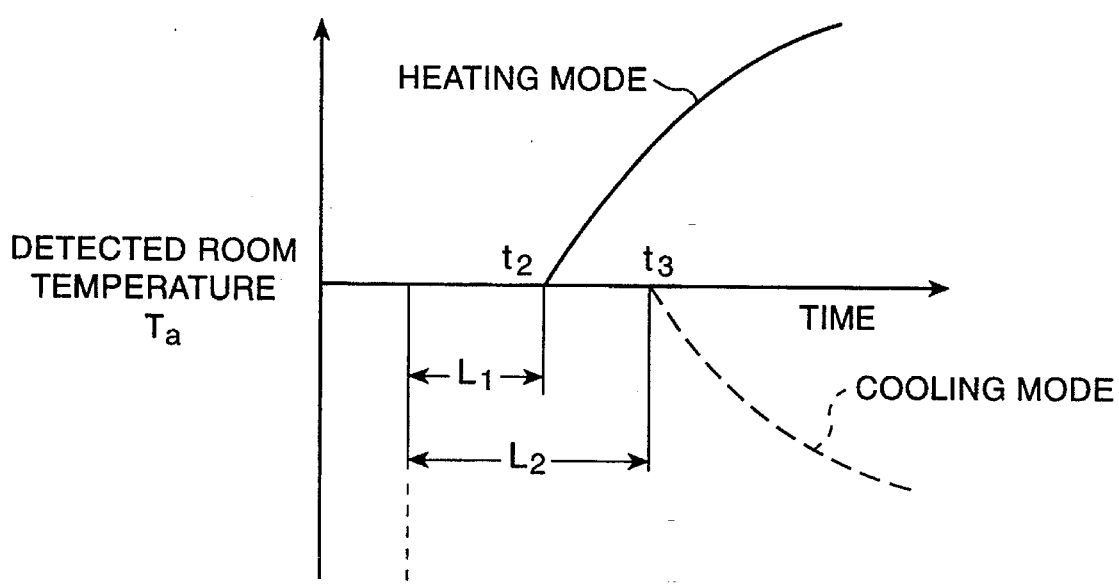
FIGS. 9(a) and 9(b) are timing charts showing the relationship between room air temperature detected by a room temperature sensor provided in an air conditioner and an air conditioning operation in a heating and a cooling mode.
Figure 9B:
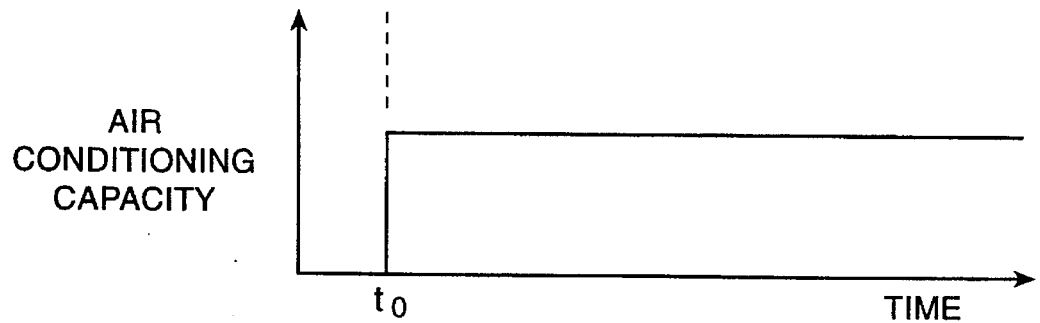
Figure 10A:
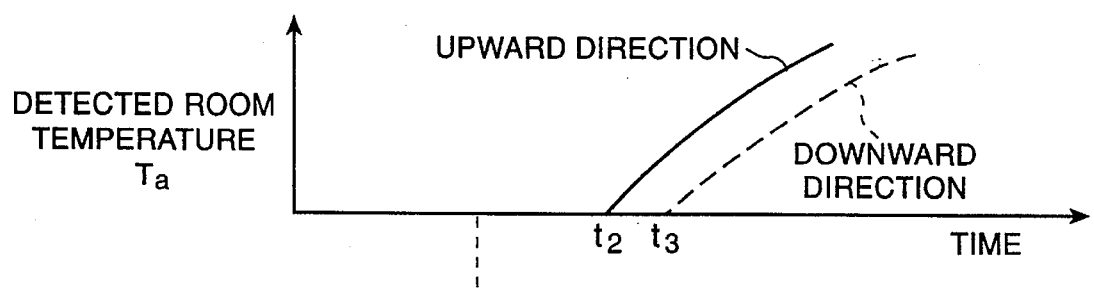
FIGS. 10(a) and 10(b) are timing charts showing the relationship between room air temperature detected by a room temperature sensor provided in an air conditioner and an air conditioning operation when a louver direction is changed.
Figure 10B:
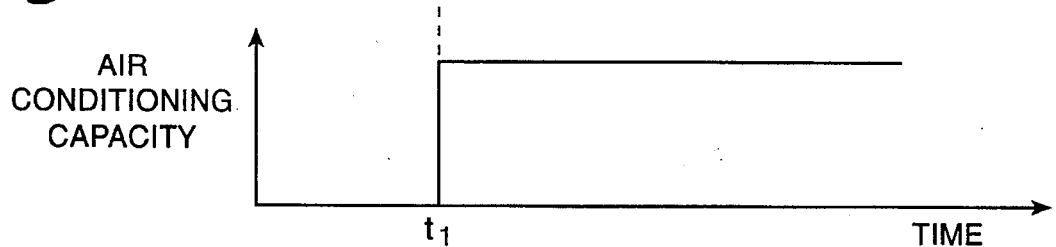
Figure 11A:
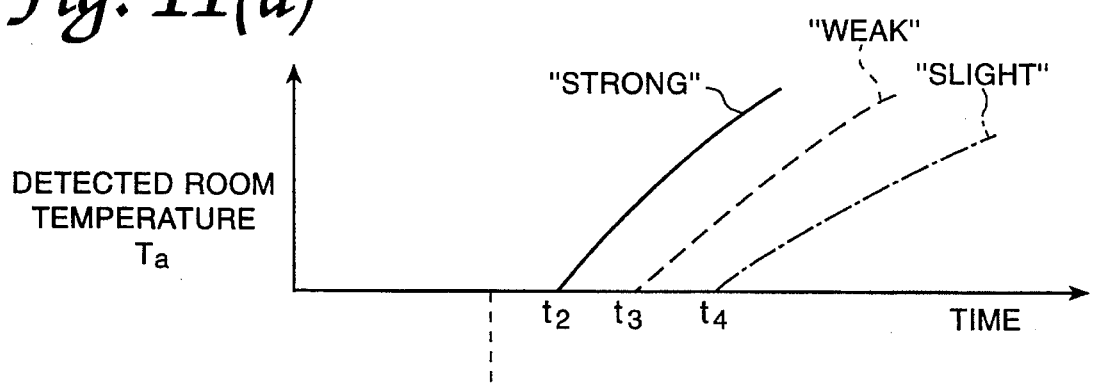
FIGS. 11(a) and 11(b) are timing charts showing the relationship between room air temperature detected by a room temperature sensor provided in an air conditioner and an air conditioning operation when the volume of air blown by the air conditioner is changed.
Figure 11B:
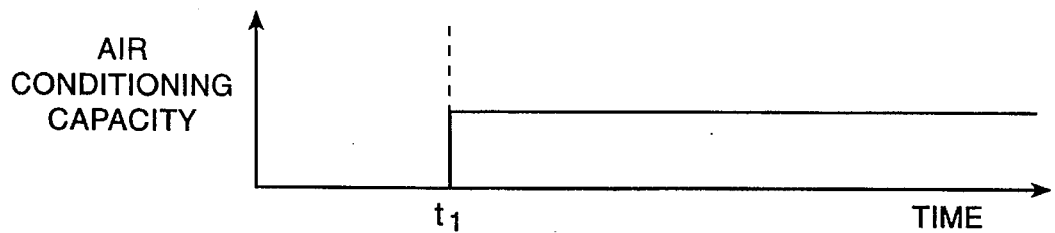

An air conditioner implementing such size detection will be described with reference to FIG. 6. This air conditioner has a refrigerating circuit and control circuits as in the first embodiment shown in FIG. 1. Thus, its description has been omitted. Only the processing sequence is described.

In the first step 801, the program determines whether or not operation is just starting. If it is the start of operation, inverter output frequency F(1) is set at a preset constant frequency Fs (step 802) and inverter control circuit 21 outputs AC power having the constant frequency Fs to the motor of compressor 1. Then, timer A is started which is set, for example, for 5 minutes as the time until the next reading of room temperature Ta(1) (step 803). In step 804, room temperature Ta(0) detected by room temperature sensor 14 is read. Next, the program waits until the 5 minute set on timer A has elapsed. After the 5 minutes has elapsed, room temperature Ta(1) is read (step 806). Then, the absolute value of ΔTa, the difference between the previously detected temperature Ta(0) and the present detected temperature Ta(1), is calculated (step 807).

Next, the program determines whether or not the absolute value of ΔTa is 1° C. or more (step 808). If it is 1° C. or more, 50 seconds is determined as set time t (step 809). If it is less than 1° C., 80 seconds is determined as set time t (step 810). After the processing of step 809 or 810, set time t is loaded on timer C and timer C is started (step 811). Then the value of counter i which indicates the total number of operation updates is set to "2" (step 812), and the program returns to step 801.

At this time, the air conditioner has been operating. Therefore, the answer of step 801 is NO. The program then determines whether or not the air conditioner is operating (step 813). If it is not operating, that is, the air conditioner is stopped, the program returns to step 801 and repeats steps 801 and 813 until the user instructs the air conditioner to start operation.

If the air conditioner has been operating, the program waits at step 814 until the set time t, counted by timer C, has elapsed. When the set time t has elapsed, the program reads detected temperature Ta(i) (step 815). The program calculates temperature difference T(i) between the present detected temperature Ta(i) and set temperature Ts and calculates temperature variation ΔT(i), the difference between the presently detected temperature Ta(i) and the previously detected temperature Ta(i−1) (step 816). In step 817, the program determines variation of operating frequency f(i) using one of Tables 4, 5 or 6, in accordance with operating mode M1, temperature difference T(i) and temperature variation amount ΔT(i), as in first embodiment.

After the determination of f(i), the program calculates a new operating frequency F(i) by adding variation of operating frequency f(i) to the previous operating frequency F(i—i) at step 818. Following this, the program determines whether or not operating frequency F(i) is equal to or greater than maximum frequency Fmax (step 819). If F(i) is equal or greater than maximum frequency Fmax, operating frequency F(i) is set at maximum frequency Fmax (step 820). If F(i) is less than maximum frequency Fmax, the program determines whether or not operating frequency F(i) is equal or less than minimum frequency Fmin (step 821). When F(i) is equal to or less than minimum frequency Fmin, operating frequency F(i) is set at the stop frequency "0" (step 822). Then, timer C is reset and started (step 823). The value of the counter i, which counts the number of operation updates, is incremented by "1" (step 824), and the program returns to the processing in step 801.

In this way, the air conditioning load in the room is judged by temperature difference $\Delta Ta$ between the detected room temperature Ta(0) when the air conditioner is started and the detected room temperature Ta(1) after the air conditioner has been operating for a specified time from the start, in this embodiment 5 minutes. By determining interval t in accordance with this result, appropriate settings can be made, regardless of the conformity between the rated performance of the air conditioner and the air conditioning load, such as the size of the room to be air conditioned.

In this embodiment, the air conditioning load is determined from the temperature variation. However, a switch for setting the size of the room may be provided in wireless remote controller 30. Thus, the user can set the load state and interval t can be determined in response to that set value.

Also, in the embodiment of FIGS. 5(a) to 5(c), time period t, which is selected based on the operating mode, the indoor fan air volume, the louver direction and the air conditioner's performance rating, is pre-stored in a ROM of the microcomputer in control circuit 11 as shown in Table 3. However, time period t may be determined based on the operating mode from which respective times for the indoor fan air volume and the louver direction may be added or subtracted. As an example, when the temperature reading interval is taken as t; the time determined by the operating mode as t1; the time determined by the room internal fan air volume as t2; the time determined by the louver direction as t3 and the time determined by the air conditioner's performance as t4, the temperature reading interval t may be determined by the following equation.

$$t = t1 + t2 + t3 + t4 \tag{1}$$

In this case, when room temperature sensor 14 is mounted in a high place in the room, time t1 determined by the operating mode will be shortest in the heating mode, longer in the dehumidifying mode, and the same as the dehumidifying mode or longer in the cooling mode. When room temperature sensor 14 is mounted in a low place in the room, time t1 determined by the operating mode will be longest in the heating mode, shorter in the dehumidifying mode and the same as the dehumidifying mode or shorter in the cooling mode. The indoor fan air volume and the performance rating of the air conditioner have no relationship to the mounting position of room temperature sensor 14. Thus, time t2 will be longest with strong air flow, shorter with weak air flow and shortest with slight air flow. Time t4 will be longer with a large air conditioning performance rating and shorter with a smaller air conditioning performance rating. When room temperature sensor 14 is mounted in a high place in the room, t3 will be shorter when the louvers face downward than when the louvers face upward. However, when room temperature sensor 14 is mounted in a low place in the room, there is hardly any effect in the delay with regard to the detected temperature. Thus, a constant value is used for any direction of the louver.

Practical embodiments of this invention have been described above. The method using Table 2 for determining the capacity variation value, that is to say variation of operating frequency f(i), corresponding to temperature difference T(i) of the detected room temperature with regard to the set room temperature and temperature change $\Delta T(i)$, which is the difference between the room temperatures beforehand after the set time period t, has the advantage that it can be achieved with less calculation.

That is to say, it can improve the response speed by omitting the extensive calculations of PID control, fuzzy control, neuro-control and the like. However, if the performance and calculation speed of control circuit 11 are sufficient, capacity vales may be calculated by the microcomputer included in control circuit 11. However, in the case of executing processing by GA, the optimum value is determined on the basis of multiple simulated results. Therefore, even more extensive calculations are required than with fuzzy control or neuro-control. Thus control can be based on the results of calculations processed beforehand by a large capacity computer. Therefore, in these embodiments, variation of operating frequency f(i) is found using tables. Thus, the amount of calculation is small.

As is clear from the above description, when using this invention, the reading time intervals of the room temperature detected by the room temperature sensor, for determining the capacity of the air conditioner, are varied according to the operating mode, the air volume blown into the room, the size of the room to be air conditioned, the rated air conditioning performance of the air conditioning, and so on. Thus, poor room temperature control, such as the hunting phenomenon, can be avoided, and preferable air conditioning capacity control can be achieved.

What is claimed is:

1. A method for varying a set time to calculate a room temperature variation for an air conditioner which can selectively operate in a cooling mode and a heating mode, said method comprising the steps of:

determining a difference between a set temperature and a sensed temperature detected by a room temperature sensor every time said set time has elapsed;

determining an amount of variation of said sensed temperature over said set time;

determining a capacity value of said air conditioner based on said difference between said set temperature and said sensed temperature and based on said amount of variation; and employing a first value for said set time in said cooling mode which is different from a second value of said set time in said heating mode.

2. A method for varying a set time to calculate a room temperature variation for an air conditioner, said method comprising the steps of:

determining a difference between a set temperature and a sensed temperature detected by a room temperature sensor every time said set time has elapsed;

determining an amount of temperature variation of said sensed temperature over said set time;

reading a capacity variation value from a preset table in a memory based on said difference between said set temperature and said sensed temperature and based on said amount of temperature variation;

adding said capacity variation value to a previous first capacity value to determine a second capacity value to control said air conditioner; and varying said set time based on a data, which is pre-stored in said memory, relating to a performance rating of said air conditioner.

3. A method for varying a set time to calculate a room temperature variation for an air conditioner which can operate by varying a direction of air blown into a room, said method comprising the steps of:

determining a difference between a set temperature and a sensed temperature detected by a room temperature sensor every time said set time has elapsed;

determining an amount of temperature variation of said sensed temperature over said set time;

reading a capacity variation value from a preset table in a memory based on said difference between said set temperature and said sensed temperature and based on said amount of temperature variation;

adding said capacity variation value to a previous first capacity value to determine a second capacity value to control said air conditioner; and varying said set time depending on said direction of air blown by said air conditioner.

4. A method for varying a set time to calculate a room temperature variation for an air conditioner which can selectively operate in a cooling mode and a heating mode, said method comprising the steps of:

determining a difference between a set temperature and a sensed temperature detected by a room temperature sensor every time said set time has elapsed;

determining an amount of temperature variation of said sensed temperature over said set time;

reading a capacity variation value from a preset table in a memory device based on said difference between said set temperature and said sensed temperature and based on said amount of temperature variation;

adding said capacity variation value to a previous first capacity value to determine a second capacity value to control said air conditioner; and employing a value for said set time in said cooling mode which is different from said value for said set time in said heating mode.

5. A method for varying a set time to calculate a room temperature variation for an air conditioner, said method comprising the steps of:

determining a difference between a set temperature and a sensed temperature detected by a room temperature sensor every time said set time has elapsed;

determining an amount of temperature variation of said sensed temperature over said set time;

reading a capacity variation value from a preset table in a memory based on said difference between said set temperature and said sensed temperature and based on said amount of temperature variation;

adding said capacity variation value to a previous first capacity value to determine a second capacity value to control said air conditioner; and varying said set time depending on a size of a room to be air conditioned.

6. A method for varying a set time to calculate a room temperature variation for an air conditioner which can operate in at least two operating modes out of cooling, heating and dehumidifying, said method comprising the steps of:

determining a difference between a set temperature and a sensed temperature detected by a room temperature sensor every time said set time has elapsed;

determining an amount of variation of said sensed temperature over said set time;

determining a capacity value of said air conditioner based on said difference between said set temperature and said sensed temperature and based on said amount of variation; and employing a value for said set time which is dependent on said operating mode.

7. A method for varying a set time to calculate a room temperature for an air conditioner which can vary a volume of air blown into a room, said method comprising the steps of:

determining a difference between a set temperature and a sensed temperature detected by a room temperature sensor every time said set time has elapsed;

determining an amount of variation of said sensed temperature over said set time;

determining a capacity value of said air conditioner based on said difference between said set temperature and said sensed temperature and based on said amount of variation; and varying said set time depending on said volume of air blown by said air conditioner.

8. A method for varying a set time to calculate a room temperature variation for an air conditioner, said method comprising the steps of:

determining a difference between a set temperature and a sensed temperature detected by a room temperature sensor every time said set time has elapsed;

determining an amount of variation of said sensed temperature over said set time;

determining a capacity value of said air conditioner based on said difference between said set temperature and said sensed temperature and based on said amount of variation; and varying said set time depending on a size of a room to be air conditioned.

9. A method for varying a set time to calculate a room temperature variation for an air conditioner which can vary a direction of air blown into a room, said method comprising the steps of:

determining a difference between a set temperature and a sensed temperature detected by a room temperature sensor every time said set time has elapsed;

determining an amount of variation of said sensed temperature over said set time;

determining a capacity value of said air conditioner based on said difference between said set temperature and said sensed temperature and based on said amount of variation; and varying said set time depending on said direction of air blown by said air conditioner.

10. A method for varying a set time to calculate a room temperature variation for an air conditioner, said method comprising the steps of:

determining a difference between a set temperature and a sensed temperature detected by a room temperature sensor every time said set time has elapsed;

determining an amount of variation of said sensed temperature over said set time;

determining a capacity value of said air conditioner based on said difference between said set temperature and said sensed temperature and based on said amount of variation; and storing data relating to a performance rating of said air conditioner in a memory device; and varying said set time based on said stored data.

11. A method for varying a set time to calculate a room temperature variation for an air conditioner which can operate in at least two operating modes out of a cooling mode, a heating mode and a dehumidifying mode, said method comprising the steps of:

determining a difference between a set temperature and a sensed temperature detected by a room temperature sensor every time said set time has elapsed;

determining an amount of temperature variation of said sensed temperature over said set time;

reading a capacity variation value from a preset table in a memory device based on said difference between said set temperature and said sensed temperature and based on said amount of temperature variation;

adding said capacity variation value to a previous first capacity value to determine a second capacity value to control said air conditioner; and varying said set time depending on said operating mode.

12. A method for varying a set time to calculate a room temperature variation for an air conditioner which can vary a volume of air blown into a room, said method comprising the steps of:

determining a difference between a set temperature and a sensed temperature detected by a room temperature sensor every time said set time has elapsed;

determining an amount of temperature variation of said sensed temperature over said set time;

reading a capacity variation value from a preset table in a memory device based on said difference between said set temperature and slid sensed temperature and based on said amount of temperature variation;

adding said capacity variation value to a previous first capacity value to determine a second capacity value to control said air conditioner; and varying said set time depending on said volume of air.

13. A method for varying a set time to calculate a room temperature variation for an air conditioner according to one of claims 1 to 10 wherein said capacity value of said air conditioner is compressor speed.

14. A method for varying a set time to calculate a room temperature variation for an air conditioner according to one of claims 1 to 2, further comprising the step of:

when said set temperature is varied during operation, correcting said capacity value of said air conditioner based on a deviation of said sensed temperature from said set temperature and a difference between said sensed temperature detected when said set timer previously elapsed and said sensed temperature currently detected.

15. A method for varying a set time to calculate a room temperature variation for an air conditioner according to one of claims 4 to 2 wherein said capacity value of said air condition is compressor speed and said capacity variation value is a speed variation value of a compressor.

16. An air conditioner comprising:

a room temperature sensor which detects a temperature inside a room to be air conditioned;

temperature setting means for variably setting a set room temperature;

mode selecting means for selecting one of a cooling mode and a heating mode of operation;

timer means for setting mutually different values of a set time depending on said selected cooling mode and heating mode and outputting a signal every time said set time has elapsed;

temperature variation detection means for detecting variations of said set room temperature which has been set by said temperature setting means;

capacity varying means for varying a capacity of said air conditioner according to a first difference in said set room temperature before said detected variation and after said detected variation;

memory means for storing a value of said detected temperature every time said timer means outputs said signal;

first calculating means for calculating a second difference between said set room temperature set by said temperature setting means and said temperature detected by said room temperature sensor every time said timer means outputs said signal;

second calculating means for calculating a third difference between said detected temperature previously stored in said memory means and a presently detected temperature, every time said timer means outputs said signal;

capacity variation determining means for determining a variation of said capacity of said air conditioner based on said second difference calculated by said first calculating means and said third difference calculated by said second calculating means;

capacity setting means for setting a new air conditioning capacity value by adding said variation of said capacity of said air conditioner to a value of said capacity of said air conditioner; and performance controlling means for controlling said air conditioner in accordance with said new air conditioning capacity value.

17. A method for controlling an air conditioner which can operate in at least two operating modes out of a cooling mode, a heating mode, and a dehumidifying mode, said method comprising the steps of:

determining a difference between a set temperature and a sensed temperature detected by a room temperature sensor every time a set time has elapsed determining an amount of variation of said sensed temperature over said set time;

determining a capacity value of said air conditioner based on said difference between said set temperature and said sensed temperature and based on said amount of variation;

varying a value for said set time which is dependent on said operating mode; and updating an operating condition of said air conditioner each time said set time has elapsed.

18. A method of varying a set time to calculate a room temperature variation for an air conditioner, said method comprising the steps of:

determining a difference between a set temperature and a sensed temperature detected by a room temperature sensor every time said set time has elapsed;

determining an amount of variation of said sensed temperature over said set time;

determining a capacity value of said air conditioner based on said difference between said set temperature and said sensed temperature and based on said amount of variation; and employing a value for said set time which is dependent on an operating mode.

* * * * *